(12) United States Patent
Chowdhary et al.

(10) Patent No.: US 9,167,439 B2
(45) Date of Patent: Oct. 20, 2015

(54) NON-INTRUSIVE IN-BAND LINK COST ESTIMATION IN MULTIHOP NETWORKS

(71) Applicant: COOPER TECHNOLOGIES COMPANY, Houston, TX (US)

(72) Inventors: Shashikant Chowdhary, Germantown, MD (US); Roger Alexander, Germantown, MD (US)

(73) Assignee: Cooper Technologies Company, Houston, TX (US)

( * ) Notice: Subject to any disclaimer, the term of this patent is extended or adjusted under 35 U.S.C. 154(b) by 164 days.

(21) Appl. No.: 13/681,118

(22) Filed: Nov. 19, 2012

(65) Prior Publication Data

US 2013/0128757 A1 May 23, 2013

Related U.S. Application Data

(60) Provisional application No. 61/561,686, filed on Nov. 18, 2011.

(51) Int. Cl.
*H04L 12/28* (2006.01)
*H04W 24/00* (2009.01)
(Continued)

(52) U.S. Cl.
CPC .............. *H04W 24/00* (2013.01); *H04W 40/02* (2013.01); *H04L 45/70* (2013.01)

(58) Field of Classification Search
CPC .... H04W 48/16; H04W 28/10; H04L 45/123; H04L 45/502
USPC .................................................. 370/252, 328
See application file for complete search history.

(56) References Cited

U.S. PATENT DOCUMENTS 7,436,789 B2    10/2008 Caliskan et al.
8,300,538 B2 *  10/2012 Kim et al. ............... 370/238
(Continued)

FOREIGN PATENT DOCUMENTS

KR    10-2011-0025787    3/2011
WO    WO 01/99345        12/2001
(Continued)

OTHER PUBLICATIONS

Written Opinion and International Search Report for International Application No. PCT/US2012/065897 dated Mar. 4, 2013.
(Continued)

*Primary Examiner* — Shaq Taha
*Assistant Examiner* — Sasha Cintron Pacheco
(74) *Attorney, Agent, or Firm* — Patterson Thuente Pedersen, P.A.

(57) ABSTRACT

In a wireless multi-hop network, packet routing paths are determined for a first node device based on passive measurement of data messages over a wireless link formed between the first node device and a neighboring second node device. The first node device transmits a first data message to the second node device via the wireless link. At least one of the first node device and the second node device monitors at least one transmission performance parameter corresponding to only a selected subset of frames of the first data message. The selected subset of frames has structural similarity to selected subsets of frames of other data messages communicated and monitored by other node devices of the network. A link cost associated with the wireless link is determined based on at least one transmission performance parameter value produced as a result of the monitoring, which can be used to update the packet routing paths.

44 Claims, 12 Drawing Sheets

(51) Int. Cl.
*H04W 40/02* (2009.01)
*H04L 12/721* (2013.01)

(56) References Cited

U.S. PATENT DOCUMENTS

| | | | |
|---|---|---|---|
| 8,411,694 B1* | 4/2013 | Orr et al. | 370/412 |
| 2004/0022223 A1 | 2/2004 | Billhartz | |
| 2004/0049595 A1 | 3/2004 | Sun et al. | |
| 2005/0286426 A1 | 12/2005 | Padhye et al. | |
| 2007/0002804 A1 | 1/2007 | Xiong et al. | |
| 2007/0070959 A1 | 3/2007 | Almeroth et al. | |
| 2007/0127419 A1 | 6/2007 | Sapek | |
| 2008/0031187 A1 | 2/2008 | Draves et al. | |
| 2008/0045181 A1 | 2/2008 | Suzuki | |
| 2008/0062926 A1 | 3/2008 | Oba | |
| 2008/0069034 A1 | 3/2008 | Buddhikot et al. | |
| 2008/0080440 A1 | 4/2008 | Yarvis et al. | |
| 2008/0279101 A1 | 11/2008 | Wu et al. | |
| 2009/0003366 A1 | 1/2009 | Chen et al. | |
| 2009/0109901 A1 | 4/2009 | Kondo et al. | |
| 2009/0135738 A1 | 5/2009 | Mhatre et al. | |
| 2009/0147722 A1 | 6/2009 | Ramachandran | |
| 2009/0201899 A1 | 8/2009 | Liu et al. | |
| 2009/0213849 A1 | 8/2009 | Sachs et al. | |
| 2009/0232014 A1 | 9/2009 | Kutschenreuter et al. | |
| 2009/0238075 A1 | 9/2009 | Mosko | |
| 2009/0274055 A1 | 11/2009 | Kutschenreuter et al. | |
| 2010/0067398 A1 | 3/2010 | Kutschenreuter | |
| 2010/0074194 A1 | 3/2010 | Liu et al. | |
| 2010/0091669 A1* | 4/2010 | Liu et al. | 370/252 |
| 2010/0118727 A1 | 5/2010 | Draves et al. | |
| 2010/0124233 A1 | 5/2010 | Shi et al. | |
| 2010/0150120 A1 | 6/2010 | Schlicht et al. | |
| 2010/0172249 A1* | 7/2010 | Liu | 370/252 |
| 2010/0238835 A1 | 9/2010 | Lundgren et al. | |
| 2010/0313063 A1 | 12/2010 | Venkataraja et al. | |
| 2011/0018704 A1 | 1/2011 | Burrows | |
| 2011/0075578 A1 | 3/2011 | Kim et al. | |
| 2011/0255429 A1 | 10/2011 | Carrera et al. | |
| 2012/0110150 A1 | 5/2012 | Kasuru et al. | |
| 2012/0198435 A1 | 8/2012 | Dirstine et al. | |
| 2013/0339941 A1 | 12/2013 | Shelton | |
| 2014/0123123 A1 | 5/2014 | Bahe | |

FOREIGN PATENT DOCUMENTS

| | | |
|---|---|---|
| WO | WO2005079536 | 9/2005 |
| WO | WO2005079539 | 9/2005 |
| WO | WO2005079517 | 8/2006 |
| WO | WO2009144756 | 12/2009 |
| WO | WO2009147584 | 12/2009 |
| WO | WO2010072652 | 7/2010 |

OTHER PUBLICATIONS

Baumann et al., "A Survey on Routing Metrics", TIK Report 262. Computer Engineering and Networks Laboratory. Switzerland. Feb. 10, 2007.

PCT/US2012/065897, filed Nov. 19, 2012, International Preliminary Report on Patentability and Written Opinion dated May 30, 2014, 6 pages.

Raisanen et al., "Network Performance Measurement with Periodic Streams," IETF RFC 3432, 2002, 23 pages.

DeCouto et al., "A High-Throughput Path Metric for Multi-Hop Wireless Routing," M.I.T. Computer Science and Artificial Intelligence Laboratory, 2003, 13 pages.

Naqvi et al., "Packet Level Measurement Over Wireless Access," Department of Electronic Engineering, Queen Mary, University of London, Feb. 2011, 142 pages.

Schormans et al., "Optimal Design of Performance Measurement Experiments for Complex, Large-Scale Networks (DOENET)," Department of Electronic Engineering, Queen Mary, University of London, 2007, 8 pages.

Draves et al., "Comparison of Routing Metrics for Static Multi-Hop Wireless Networks," Microsoft Research, 2004, 12 pages.

Hui, Deluge 2.0—TinyOS Network Programming, 2005, 12 pages.

* cited by examiner

NON-INTRUSIVE IN-BAND LINK COST ESTIMATION IN MULTIHOP NETWORKS

PRIOR APPLICATION

The present application claims the benefit of U.S. Provisional Application No. 61/561,686 filed Nov. 18, 2011, which is incorporated by reference herein in its entirety.

FIELD OF THE INVENTION

The invention relates generally to data communications via multihop networks and, more particularly, to efficiently estimating the cost associated with links between network nodes for effective message routing.

BACKGROUND OF THE INVENTION

A wireless multihop communications network, such as a mesh network, includes a set of nodes capable of exchanging messages with one another over a wireless medium, typically using radio frequency (RF) airwaves. Each of the nodes can be primarily a communications device or, alternatively, the communications functionality may be secondary to its primary function. For example, in a given node, the communications circuitry can be a part of a device such as a computer system, a smart appliance, a vehicle, a media device, a piece of industrial equipment (e.g., an instrument, machine, sensor, actuator), and the like.

In a mesh architecture the nodes are uniquely addressable, and able to route messages from an originating node toward the intended destination node. In general, each of the nodes can be an originating and destination node as well. Although routing can be centrally controlled, this approach requires the central controller to have an intimate knowledge of the network topology. This often presents difficulties in situations where the topology is dynamic such that nodes may join or leave the network, or have varying degrees of connectivity due to changing circumstances. Accordingly, a variety of techniques have been developed for distributed routing in which individual nodes make routing decisions based on information that they have about the current (or nearly current) state of the network.

In one type of routing algorithm, known as a link-state routing, each of the nodes constructs a map of the entire network and determines a complete or partial route for a message which that node originates based on one or more criteria for route optimization. In another approach, known as distance vector (DV) routing, each node assesses local connectivity distance to its immediate neighbors and uses the information obtained from these neighbors to construct the total path distance to other nodes in the network, without having to keep track of the actual pathways. In DV routing, an originating or forwarding node indicates which one of its neighbors should be the next hop for the message transmission. Each hop toward a particular destination node is associated with a cost. The decision of which neighbor to specify as the next hop is based on a comparison of the predetermined total costs to the destination through each of its neighbors, with the lowest-cost neighbor prevailing. Various routing mechanisms and metrics for cost estimation are disclosed and compared in Baumann, Heimlicher, Strasser, and Weibel, "A Survey on Routing Metrics," Computer Engineering and Networks Laboratory, ETH-Zentrum, Switzerland (2007), which is incorporated by reference herein.

Regardless of which routing algorithm is used, routing metrics are needed to determine a best route. A simple distance metric is hop count, which represents the number of hops needed to reach the destination. Other known metrics are based on time delay statistics, transmission success statistics, radio link quality, and bandwidth capacity. A routing metric commonly employed in wireless mesh networks is a traffic-based metric called "Expected Transmissions Count" (ETX). ETX represents the expected (or average) number of transmissions required on a particular link to deliver a message successfully to that neighbor. This type of metric assigns a high cost to retransmitssions of failed frames, which produce consequences of reduced throughput, channel use inefficiencies, time delays, and the like, which may be more burdensome to overall network efficiency than other measures such as higher hop counts, for instance. ETX values also, to some extent, reflect radio link performance and the incidence of possible interference or obstructions, the presence of which tends to result in retransmissions, thereby increasing the ETX value for a particular link.

In a given wireless multihop network, the routing metric is typically determined by sending special probing messages between nodes, and measuring the performance of the link in delivering the probing messages. Probing messages have predetermined size and information format and content, which establishes a uniform condition to test link performance from one instance to another. In one approach, specialized probing messages are periodically sent between nodes with higher-than-normal priority in the routing queues. One drawback of these so-called out-of-band probing messages is they may not represent the network conditions that ordinary traffic experiences. In another approach, probing packets are interlaced with the regular traffic. These so-called in-band measurements contribute to the amount of traffic and network resource overhead, thereby reducing the efficiency of the network.

Probing messages are preferably sent around with some regularity, or periodicity. See, for example, Raisanen, Grotefeld, and Morton, "Network Performance Measurement with Periodic Streams," IETF RFC 3432, (2002), incorporated by reference herein. Ideally, smaller intervals can provide insight into link performance at various times and under various conditions to provide a statistically reliable representation of the true link quality. However, small intervals require large amounts of overhead. Conversely, increasing the interval between probing messages increases the risk of missing important information. There are additional challenges of collecting balanced statistics from one node to the next in network topologies where certain nodes are much more active than others.

As an alternative to the use of probing messages, passive methods of monitoring a routing device's performance have been proposed, generally in the context of Internet traffic routers. Passive monitoring generally examines the performance of a router that operates at the packet level. Measured parameters include such measures as packet queue lengths, losses and waiting times. More advanced passive monitoring applications utilize packet sniffing, tcpdump, and polling the management information base (MIB). Although this passive approach is non-intrusive in that extra traffic is not introduced as is the case with probing packets, it suffers from not having an objective measure that probing packets provide. Since passive measures look at existing traffic, the performance data is based on packets that can vary considerably in size and content. For a wireless network, packets that are larger will naturally have more difficulty being communicated successfully than smaller packets. The passive approaches are also resource-intensive in terms of requiring considerable processing and memory overhead. This problem is not as acute in the Internet router context, where devices are line powered, and have considerable processing capacity. However, in wireless networks or networks in which the nodes are attached to low-power or low-cost devices, such computing overhead is not feasible from a technical constraint or cost constraint perspective.

In fact, wireless multihop networking is becoming increasingly ubiquitous, and is finding its way into applications in which nodes are low-bandwidth, low-cost, or low-power devices. Very often, nodes have all three of these constraints. These pressures are often coupled with the growing demands of data throughput as data sources become increasingly sophisticated. As a result of these, and other, developments, a practical and efficient solution is needed for gathering reliable routing metrics without unduly burdening the network's capacity.

SUMMARY OF THE INVENTION

Aspects of the invention is directed to a wireless multi-hop network in which node devices communicate a plurality of data messages to one another. The data messages are formatted as a series of at least one packet that is further formatted as a series of at least one frame. In one aspect, a method for determining packet routing paths for a first node device based on passive measurement of data messages over a wireless link formed between the first node device and a neighboring second node device is provided. The method includes transmitting, by the first node device, a first data message of the plurality of data messages to the second node device via the wireless link. Additionally, the method includes monitoring, by at least one of the first node device and the second node device, at least one transmission performance parameter (e.g., retransmissions, time duration, etc.) corresponding to only a selected subset of frames of the series of at least one frame of the first data message. The selected subset of frames has structural similarity (e.g., size distribution within a data message) to selected subsets of frames of other data messages communicated and monitored by other node devices of the network. A link cost (e.g., ETX) associated with the wireless link is determined based on at least one transmission performance parameter value produced as a result of the monitoring of the at least on transmission performance parameter. The first node device then stores a packet routing path characteristic (e.g., updated routing table, updated data rate) applicable to packets to be transmitted via the first node device, the packet routing path characteristic having been determined based on the link cost associated with the wireless link.

This approach provides quality link cost metrics without requiring the additional overhead of sending specialized probing packets.

A number of other advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which.

Figure 1:
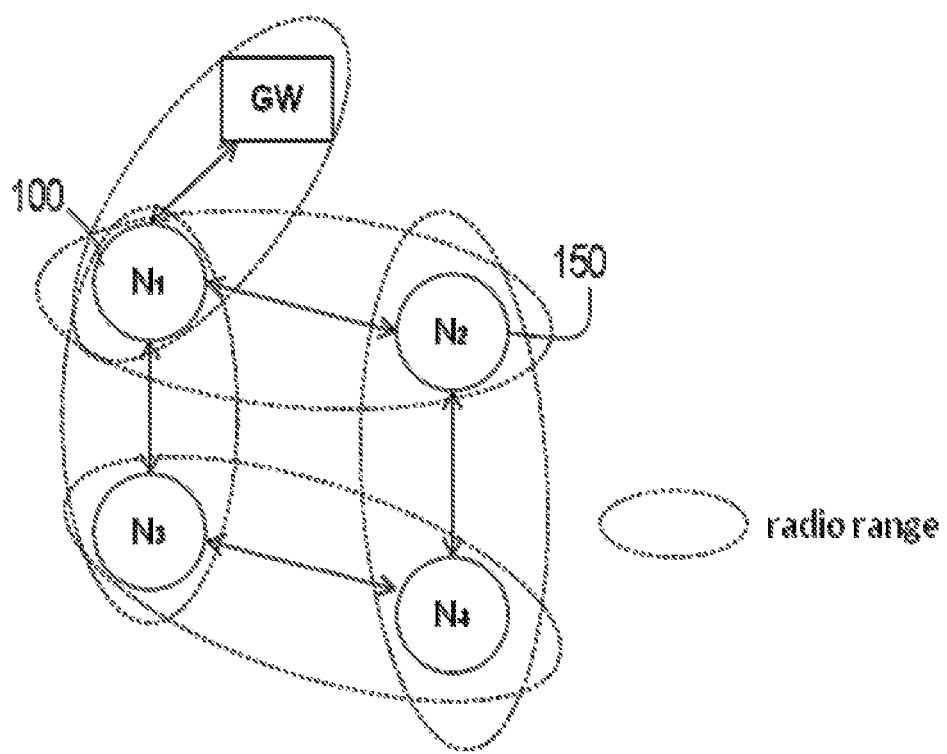
FIG. 1 is a network topology diagram illustrating an exemplary wireless multihop network in which embodiments of the invention may be applied.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Aspects of the invention are generally directed to routing of packets in a wireless multihop network. A multihop network is one where node devices transmit data messages to one another, including through intermediate node devices that can act as routing devices for purposes of relaying data messages towards their final destination, which can be an endpoint node device on the local network, or a gateway node device that provides a connection between the local network and another network. A well-known example of a multihop network is the mesh network topology. Embodiments of the invention may be used in a variety of applications involving data communications. One such application is in energy metering, such as a radio frequency (RF) Mesh advanced metering infrastructure (AMI) network that can provide utilities with a single integrated-mesh network for electric, water and gas data communications with the ability to support multiple meter vendors. Such systems can be deployed using a licensed or unlicensed RF band. However, it should be understood that the principles of the invention are applicable in a variety of different applications besides energy metering.

FIG. 1 is a diagram illustrating an exemplary wireless multihop network. Endpoint node devices $N_1$-$N_4$ act as sources and destinations of data to be communicated, as well as relays of data to be forwarded to its destination. Gateway node device GW provides a connection between the local network and another network. The areas shown in broken lines represent the radio ranges for the various nodes devices. Those node devices which are within radio range are referred to herein as neighboring devices or, simply, neighbors. Thus, devices $N_1$ and $N_2$, within communications range of each other, are indicated respectively by reference numerals 100 and 150.

Figure 2:
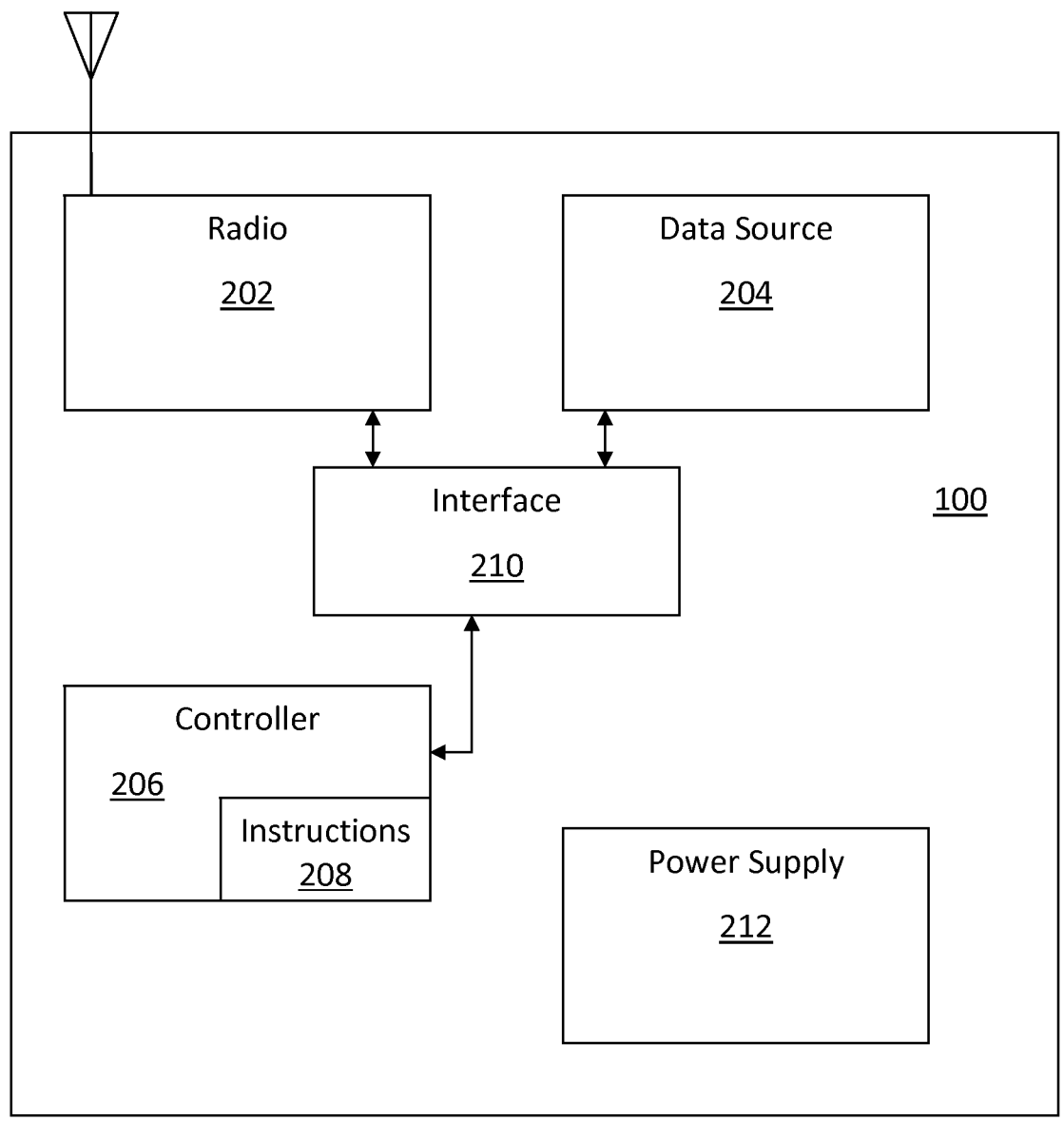
FIG. 2 is a block diagram illustrating portions of an exemplary node device according to one embodiment of the invention.

FIG. 2 is a block diagram illustrating portions of node device 100. Node device 100 includes radio circuit 202 having transmitter and receiver portions. In one example embodiment, the radio circuit is a 50-channel frequency hopping spread spectrum radio. Data source 204 is that portion of node device 100 which is served by radio circuit 202, and provides any one or more of a variety of primary functions of node device 100 besides the communication function. For example, in an AMI application, data source 204 may be a utility meter; in an industrial control application, data source 204 may be an instrument, sensor, or actuator; in an information technology application, data source 204 may be a computer system.

Controller 206 oversees and coordinates functionality of radio circuit 202 and, in some architectures that integrate the communications portion and data source portions of node device 100, controller 206 controls the operation of data source 204. In other embodiments, data source 204 can have its own controller. In one embodiment, controller 206 includes processing hardware, such as one or more processor cores, memory units (volatile, non-volatile, or both), input/output facilities, and other such processing-related components. Controller 206 also includes instructions 208, which can include basic firmware, an operating system, device drivers, and other system code. In addition, instructions 208 include application-level code that defines the higher functionality of node device 100, including operation of the communications modules detailed hereinbelow. Interface circuit 210 facilitates input and output of application and control data between radio circuit 202 and data source 204 according to the embodiment depicted in FIG. 2. In one embodiment, interface circuit 210 includes an digital to analog (D/A) or analog to digital (A/D) circuit, or both. In related embodiments, interface circuit 210 can include one or more of: a bus circuit, a serial port, a parallel port, or any combination thereof.

Power supply circuit 212 provides electrical power for use by the other circuitry of node device 100. Various circuitry may have different power requirements, such as different supply voltages, source or ground isolation, or the like. Accordingly, power supply 212 provides the needed power requirements. In one embodiment, power supply circuit 212 includes the energy source, such as a battery, for example. In other embodiments, power supply 212 includes a power capture circuit such as a photovoltaic cell, for example, or an electrical generator circuit. In still other embodiments, power supply circuit 212 relies on externally-supplied power, such as from an AC mains source, and converts and conditions that power to the various supply taps for the other portions of node device 100.

With reference specifically to the communications functionality implemented by controller 206, Table 1 below lists a set of abstraction layers that implement major portions of the communications functionality according to one embodiment. Although the abstraction layers describe a software architecture, it should be noted that the software architecture configures the controller hardware into a plurality of functional modules.

The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor core(s) of controller 206. Accordingly, each module can be realized in a variety of suitable configurations, and should not be limited to any particular implementation exemplified herein.

TABLE 1

Exemplary Abstraction Layers

| Layer | Data unit | Primary function(s) |
|---|---|---|
| Application | Data | Network process to data source |
| Network | Packet | Packetization of data; routing path determination |
| Radio Abstraction Interface (RAI) | | |
| SAR | Segment | Segmentation and reassembly of packet segments |
| MAC | Frame | Coordination of the link state between two devices, including when link access may and may not occur; frame level authentication, and data reliability. |
| Link | Frame | Parsing and packing frames; connection/synchronization and reliable data delivery |

The application layer provides the communication system interface for data source 204. Accordingly, the application layer processes are passed data from data source 204 to be transmitted via radio circuit 202, and provide data received to data source 204 in the appropriate format. The network layer serves the application layer primarily by packetizing data for transmission. Packets generally contain portions of the data as a payload, and further include control information for routing the packet and reassembling the data it contains. In this exemplary implementation, routing is performed at the network layer. The radio abstraction interface (RAI) translates standardized function calls by the network layer to radio-specific or protocol-specific instructions for lower layers, and vice-versa. This allows the application and network layer codes to be universal to all radios and protocols which support the RAI.

The segmentation and reassembly (SAR) layer applies further coding to packets and, in dome implementations, further divides the packets. The medium access control (MAC) layer coordinates the link state between two devices, including when link access may and may not occur. In one embodiment, the MAC layer maintains a link connection state machine and insures the reliable delivery of data traffic via ACK/retransmission procedures. In a related embodiment, the MAC layer provides the mechanism to insure that the link is properly authenticated and lays the basis for establishing encrypted communications before data traffic is allowed to traverse the link.

The link layer provides lower-layer services to the MAC layer. In one such embodiment, the link layer handles the details of the link layer protocol, including parsing and packing the data messages into frames. In addition, link layer implements the connection/synchronization and reliable data delivery procedures.

Figure 3:
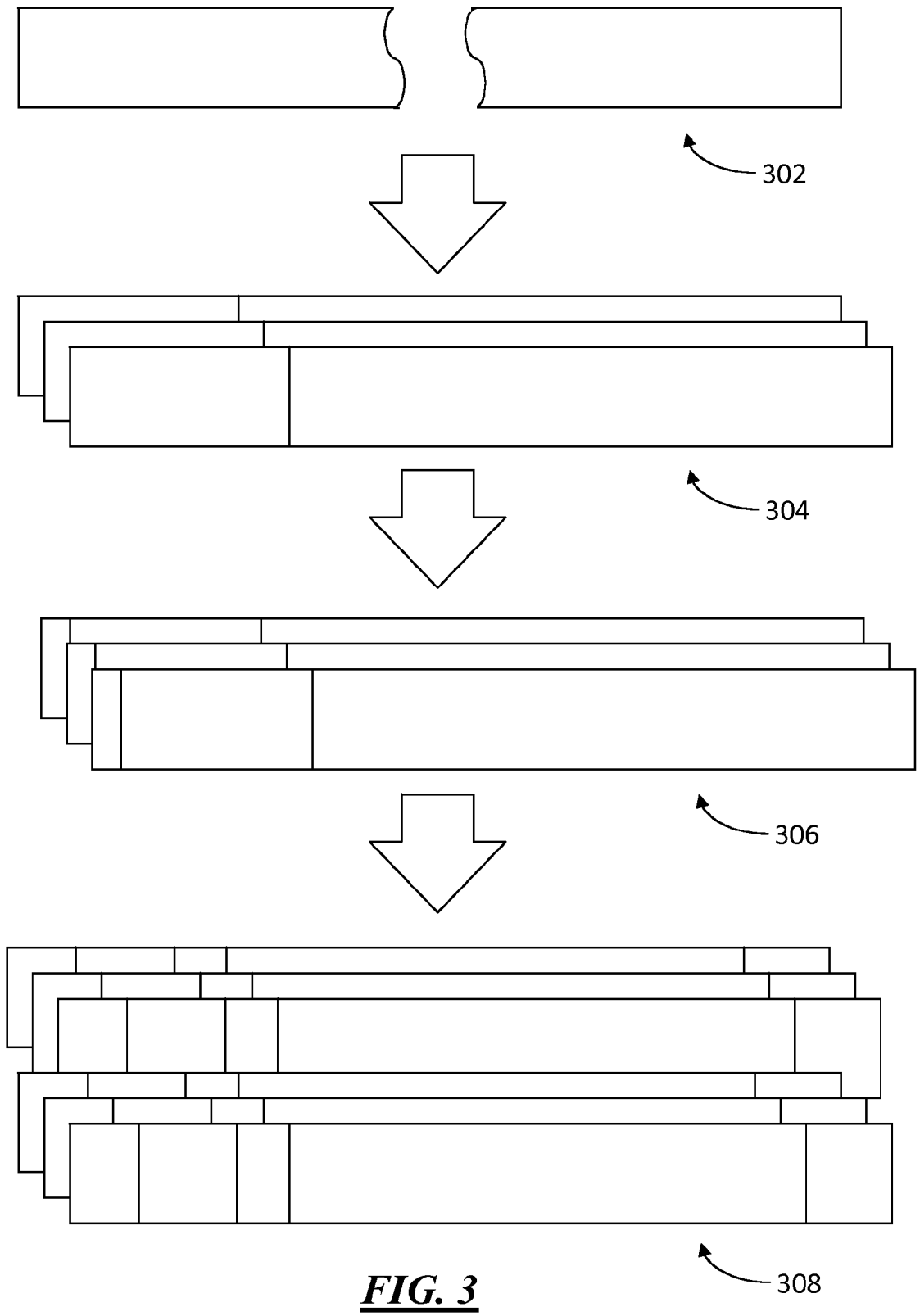
FIG. 3 is a simplified diagram illustrating generally one exemplary relationship between various data units such as packets, segments, and frames.

FIG. 3 is a simplified diagram illustrating generally one exemplary relationship between various data units. A data message 302 is assembled into one or more packets 304. Thus, depending on the size of the data message, either the entire data message, or portions thereof, are placed into the payload of each packet 304. Networking-related information is added to each packet. In embodiments utilizing the SAR layer the packets are further formatted as segments 306 with additional control information needed to reconstruct the packets after transmission and reception. Each of the packets (or segments) are then further formatted as one or more frames 308. In various embodiments, frames 308 include additional coding of the data payload to facilitate transmission, security, or both, as well as coding for supporting the reliable delivery service and error detection/correction. Also, in various embodiments, frames include framing information. Framing is the process of aligning the packet within the bit stream using specific coding for correlation, clock synchronization, and the like. In various embodiments, the respective protocols can specify fixed lengths for frames, or allow for variable-length frames. In the latter, the framing includes control information that is indicative of the start and end of frames. Such information can be in the form of a starting sequence which is part of the preamble and an indication of frame length, or an ending sequence appended to the back of the frames.

Figure 4:
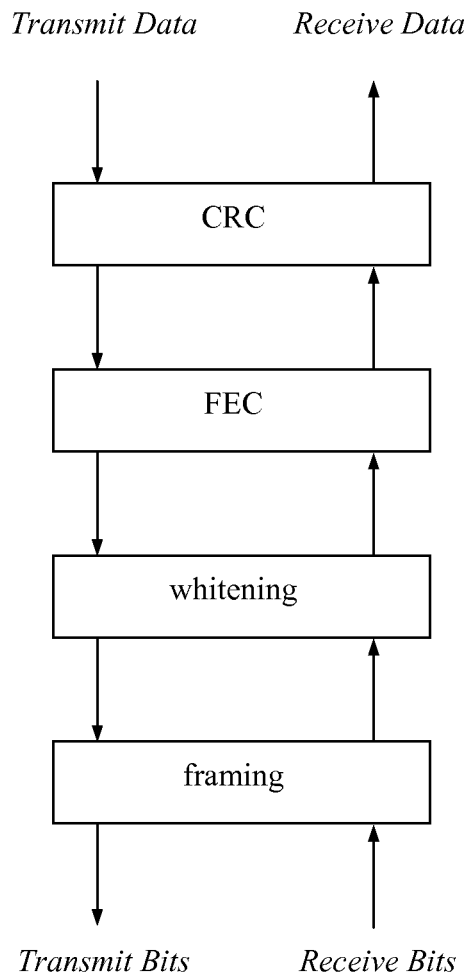
FIG. 4 is a simplified flow diagram illustrating an exemplary order of formatting operations to create frames for transmission, and to obtain the data payload from received frames, according to one embodiment.

FIG. 4 is a simplified flow diagram illustrating an exemplary order of formatting operations to create frames for transmission, and to obtain the data payload from received frames, according to one embodiment. For transmission, a cyclical redundancy check (CRC) portion is computed and appended to the data. Next, forward error correction (FEC) is added. Subsequently, a process of whitening is applied to make the data spectrally uniform. Finally, framing fields are added to assist in synchronization, and the like.

Figure 5:
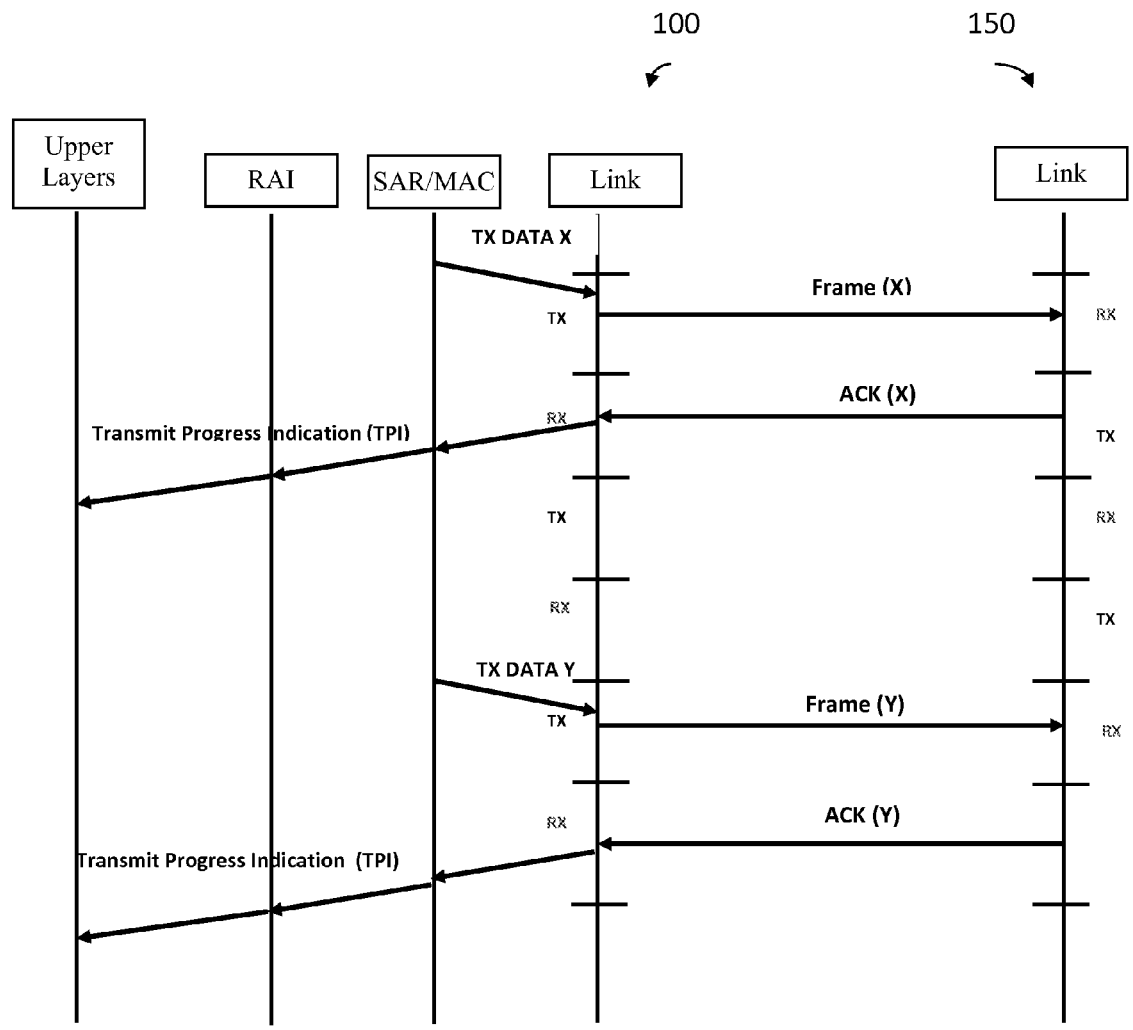
FIG. 5 is a simplified data exchange diagram illustrating the reliable transmission of subsequent frames, from a node device to a neighboring node device according to one embodiment.

FIG. 5 is a simplified data exchange diagram illustrating the reliable transmission of subsequent frames, frame (X) and frame (Y), from node device 100 to neighboring node device 150. The link layer coordinates transmission of each frame using transmission and receiving slots indicated as TX and RX in FIG. 5. The successful transmission of each frame is followed in the subsequent slot by reception of a frame acknowledgement (ACK). Failure to receive an ACK prompts the link layer to resend the frame. In the embodiment shown in FIG. 5, success of a frame transmission (i.e., the fact that an ACK was received) is reported to the upper layers as Transmit Progress Indication (TPI). In a related embodiment, transmission failures (i.e., the absence of an ACK in the expected receive slot) are reported to the upper layers as the TPI. This measure of performance can be used in some embodiments to compute a transmission performance value based on multiple samples of the TPI as the parameter on which the statistically-determined transmission performance value is based. It should be noted that in these embodiments, the TPI and transmission performance value are based on activity at the link layer, rather than on activity at higher layers.

Figure 6:
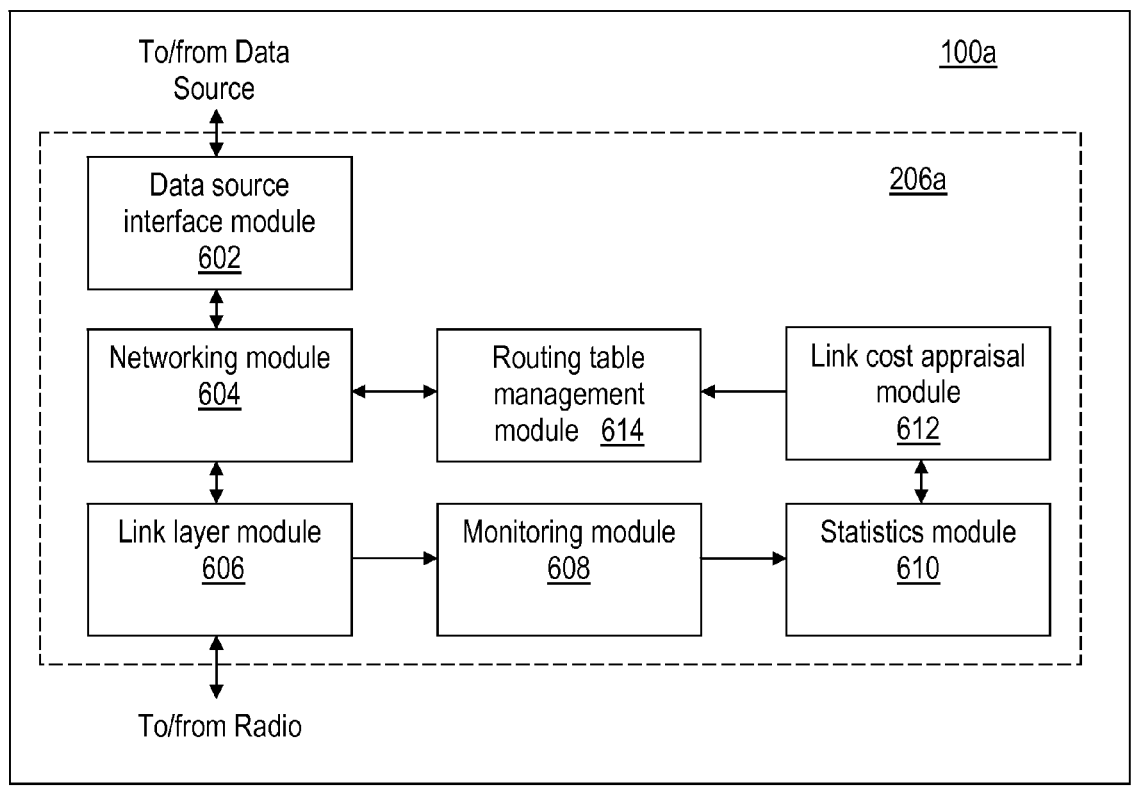
FIG. 6 is a block diagram illustrating various functional modules of an exemplary node device according to one embodiment.

Referring now to FIG. 6, functional modules of an exemplary node device 100a are illustrated. In the embodiment shown, node device 100a includes controller 206a with which modules 602-614 are realized. Data source interface module 602, which may be regarded as operating primarily at the application layer, exchanges raw data with the data source portion. Networking module 604, operating primarily at the network layer, performs packetization of data and routing functionality.

Link layer module 606 interfaces with the radio circuit and operates primarily at the link layer, carrying out the link layer operations described above. Monitoring module 608 monitors one or more transmission performance parameter, such as retransmissions, ACKs sent, failures to receive ACKs, data rate achieved, or other such observable parameter.

Figure 7:
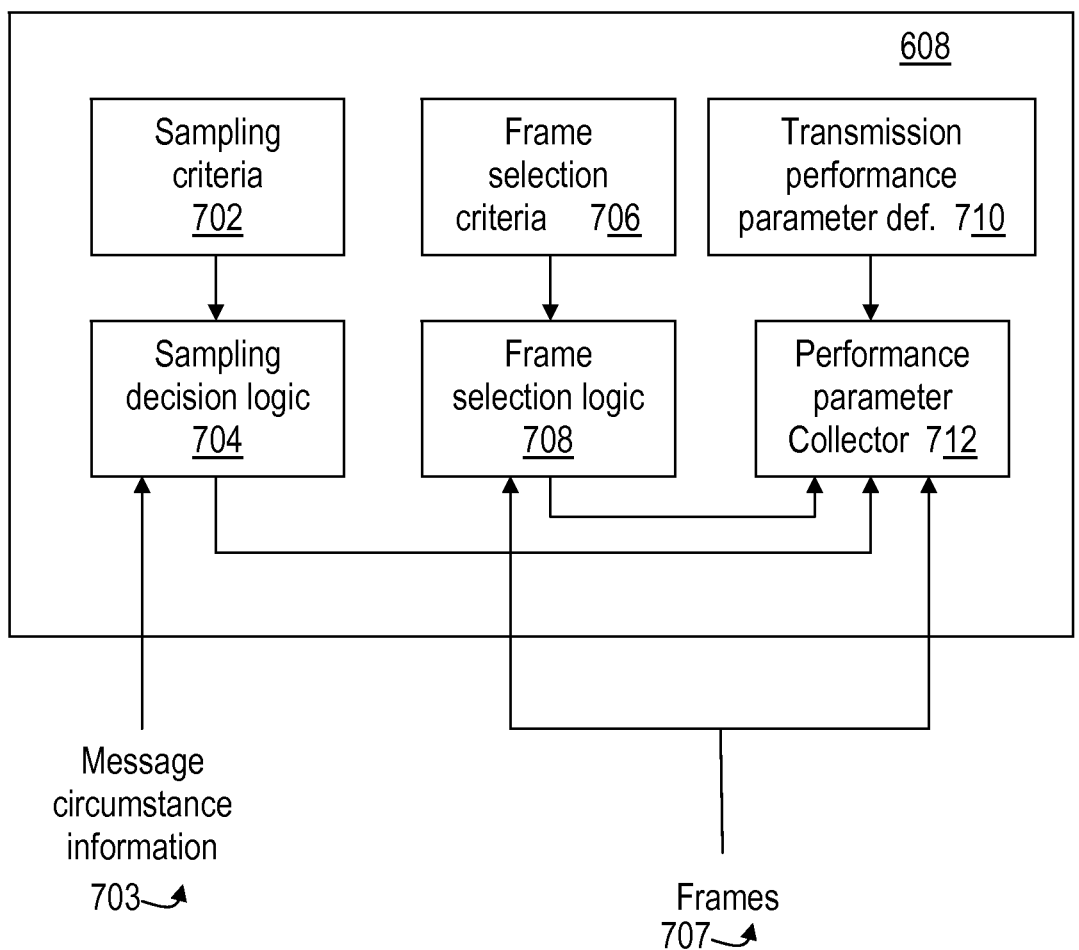
FIG. 7 is a block diagram illustrating functional modules of a monitoring module according to one type of embodiment.

FIG. 7 is a block diagram illustrating functional modules of monitoring module 608 according to one type of embodiment. Sampling criteria 702 represents when it is appropriate to take a sample. In various embodiments, sampling criteria 702 includes criteria for which data messages are subject to sampling of transmission performance parameter values. In one approach, all data messages are subject to measurement. In an alternative approach, only certain data messages are selected.

The selection of data messages can be based on any of a variety of circumstances, such as time of day, data message priority, specified data rate for the data message, traffic trends over the link (i.e., quantity of data messages per unit time), time elapsed since the previous data message transmitted over the link, etc. Data messages can be selected in order to manage energy or other resources being expended to compute link cost. For node devices that receive large amounts of traffic relative to other node devices of the local network, such as devices along frequently-used routes to a gateway device, for instance, monitoring every single data message may be wasteful when similar statistics can be collected by monitoring every $n^{th}$ data message, for example.

Accordingly, in this embodiment, sampling decision logic 704 reads the sampling criteria 702, and obtains message circumstance information 703, which it compares against sampling criteria 702. If the criteria is satisfied, the data message is deemed subject to sampling.

Frame selection criteria 706 represents which frames within to-be-sampled data messages are to be selected for sampling. In one approach, only a subset of the frames of each data message are sampled. In a related embodiment, the selected frames are selected purposefully, such that there is structural similarity among the selected subset of frames from one data message to the next, taking into consideration all data messages exchanged over the local network. One example of a structural similarity parameter is frame length. Longer frames have a greater likelihood of having to be re-transmitted, whereas shorter frames by contrast have a greater likelihood of success. Another example of structural similarity parameter is the location of the frame within a data message. A further example of structural similarity parameter is the spectral power distribution of the frame. Taking into consideration the structural similarity of the frames within the selected subset to selected subsets of other data messages ensures uniform transmission performance parameter measures from one link to another.

According to one approach, the degree of structural similarity that the selected subsets of sampled frames should have across data messages is an extent of similarity such that transmission success of the selected subset of frames is substantially unaffected by any variations in frame structure of the frames of selected subsets among the different data messages.

It should be noted for this approach that the selected frames within a given selected subset need not be structurally similar with one another, although they certainly may be similar. Rather, the structural similarity compares the selected frames of each data message to those of other data messages. In this way, the selected frames of a particular data message can be of various lengths. So long as the frame length distribution of the selected subset of frames of each data message is similar, the structural similarity requirement of this embodiment can be met.

In a simple approach, selection of frames takes into account features of a particular protocol to ensure the structural similarity. For instance, in one such embodiment, the protocol defines that the first m frames of each data message are dedicated to data message authentication and other consistent information exchanges. These defined frames have structural similarity from one data message to another. Thus, in this embodiment, the frame selection criteria simply identifies the first m frames of each data message as those which are subject to sampling.

Frame selection logic 708 applies frame selection criteria 706 to the incoming frames 707, and selects only those frames which meet the criteria. Frame selection logic 708 then forwards either the identifiers of the selected frames, the time slots associated with the selected frames (or their ACKs), or the frames themselves, to performance parameter collector 712. Performance parameter collector 712 obtains the transmission performance parameter value for each of the sampled frames based on transmission performance parameter definition 710. One example embodiment of transmission performance parameter definition 710 is retransmission count of the frame (i.e., the presence or absence of an acknowledgement frame in the subsequent reception time slot following the frame or retransmitted frame in question). In various embodiments, other parameters are collected separately, or in addition to, the retransmission count, such as highest achieved data rate, time duration for successful transmission, etc.

In one particular embodiment, the transmission performance parameter is a composite parameter based on more than one base parameter. For example, retransmission count and actual data rate are collected together by performance parameter collector 712. In a related embodiment, a multi-variable ETX determination is made, with ETX values being associated with a corresponding data rate.

Figure 8:
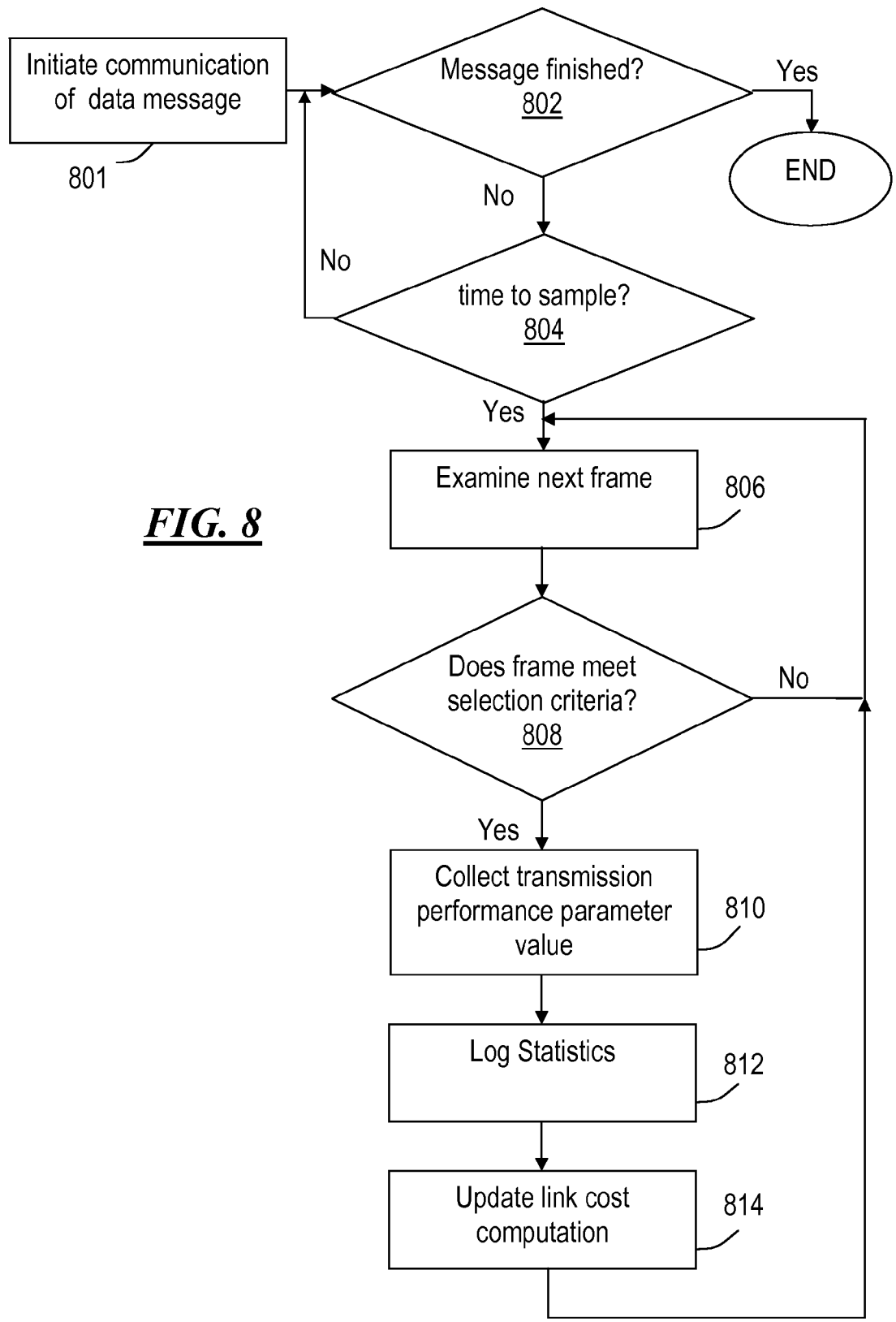
FIG. 8 is a flow diagram illustrating a process of monitoring traffic according to one embodiment.

FIG. 8 is a flow diagram illustrating a process of monitoring traffic according to one embodiment. At 801, the transmission of a data message is started. Decision block 802 determines the exit point from this algorithm. If the message is not finished, the process proceeds to decision block 804, which determines whether it is time to sample. In various embodiments, decision block implements the functionality of sampling decision logic 704.

If it is time to sample, the next frame is examined at 806. Decision block 808 determines if the frame meets the frame selection criteria 706. If so, the process proceeds to collecting the transmission performance parameter value at 810. At 812, the value is logged. At 814, the link cost computation is updated based on the values collected.

Figure 9:
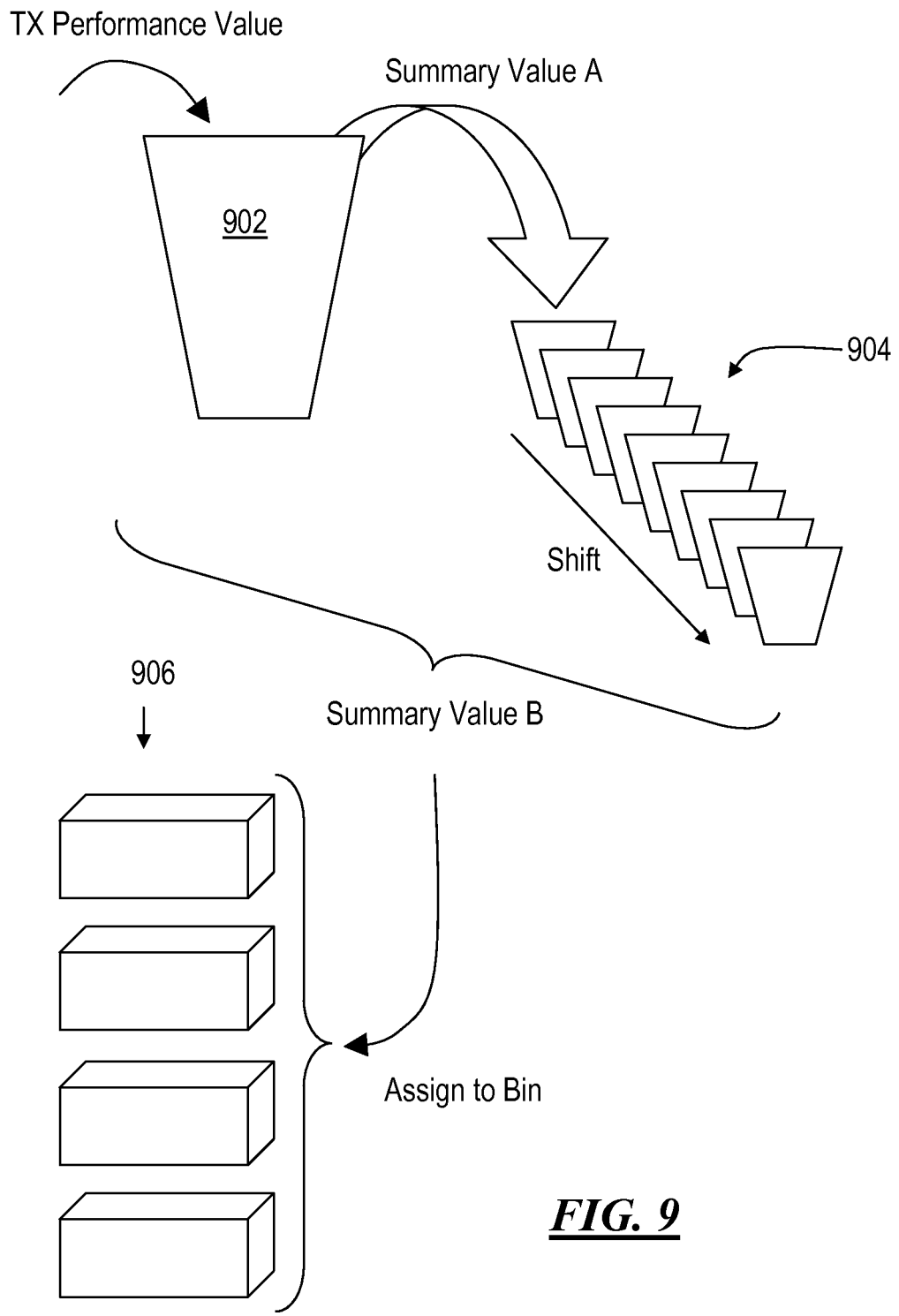
FIG. 9 is a diagram illustrating a bucket filtering algorithm for determining a weighted running average link cost according to one embodiment.

Referring back to FIG. 6, statistics module 610 collects multiple samples of the transmission performance parameter values obtained by monitoring module 608, and performs a statistical summary of those multiple values. In one embodiment, the statistical summary represents a statistical summary, such as an average value, median value, or most frequent value. In a related embodiment, the summary statistic is weighted, for instance, a running average with greater weight attributed to more recent values. In one approach, as illustrated in FIG. 9, a bucket filtering algorithm is implemented. Transmission performance parameter values are collected for each monitored frame in large bucket 902. Large bucket 902 has a predefined size, such as a 50-sample capacity, for instance. This value can be adjusted, either manually, or dynamically, to tune the weighting. When large bucket 902 fills up with samples, a summary, such as a mean, median, mode, or the like, is computed as Summary Value A, and placed in a first small bucket 904. Large bucket 902 is cleared out, after which point fresh samples are collected in large bucket 902. When a new Summary Value A is computed upon the subsequent filling of large bucket 902, that new value is placed in the first small bucket 904, and the value previously in the first small bucket is shifted into the next small bucket 904 as indicated. When all of the small buckets 904 are filled, and in response to the filling of large bucket 902, The current Summary Value A is statistically summarized with each of the values in small buckets 904 to produce a Summary Value B. Summary Value B is a weighted running average of the monitored transmission performance parameter, and can be used in some embodiments as a measure of the link cost.

In a related embodiment, as depicted in FIG. 9, Summary Value B is assigned to one of bins 906. Each bin 906 is associated with a predefined range of values, and represents a class of monitored transmission performance for the link. The ranges can be of different sizes and have adjustable boundaries according to one example embodiment. For instance, where the transmission performance parameter is expected transmission count (ETX), bins 906 can have the following ETX ranges: bin 1: 1-1.5; bin 2: 1.6-3; bin 3: 3.1-6; bin 4: 6.1-MAX. Routing logic can be preconfigured to make decisions based on bin number assignment, rather than on set values.

Link cost appraisal module 612 performs the computation of link cost based on the statistical data. The link cost metric in one embodiment can be ETX. In other embodiments, other metrics, or combinations of metrics, may be utilized.

The link cost value is passed to routing table management module 614, which updates the routing information according to the predetermined link cost-based algorithm for routing. Networking module 604 makes reference to routing table management module 614, and performs updates of the routing tables as needed.

Figure 10:
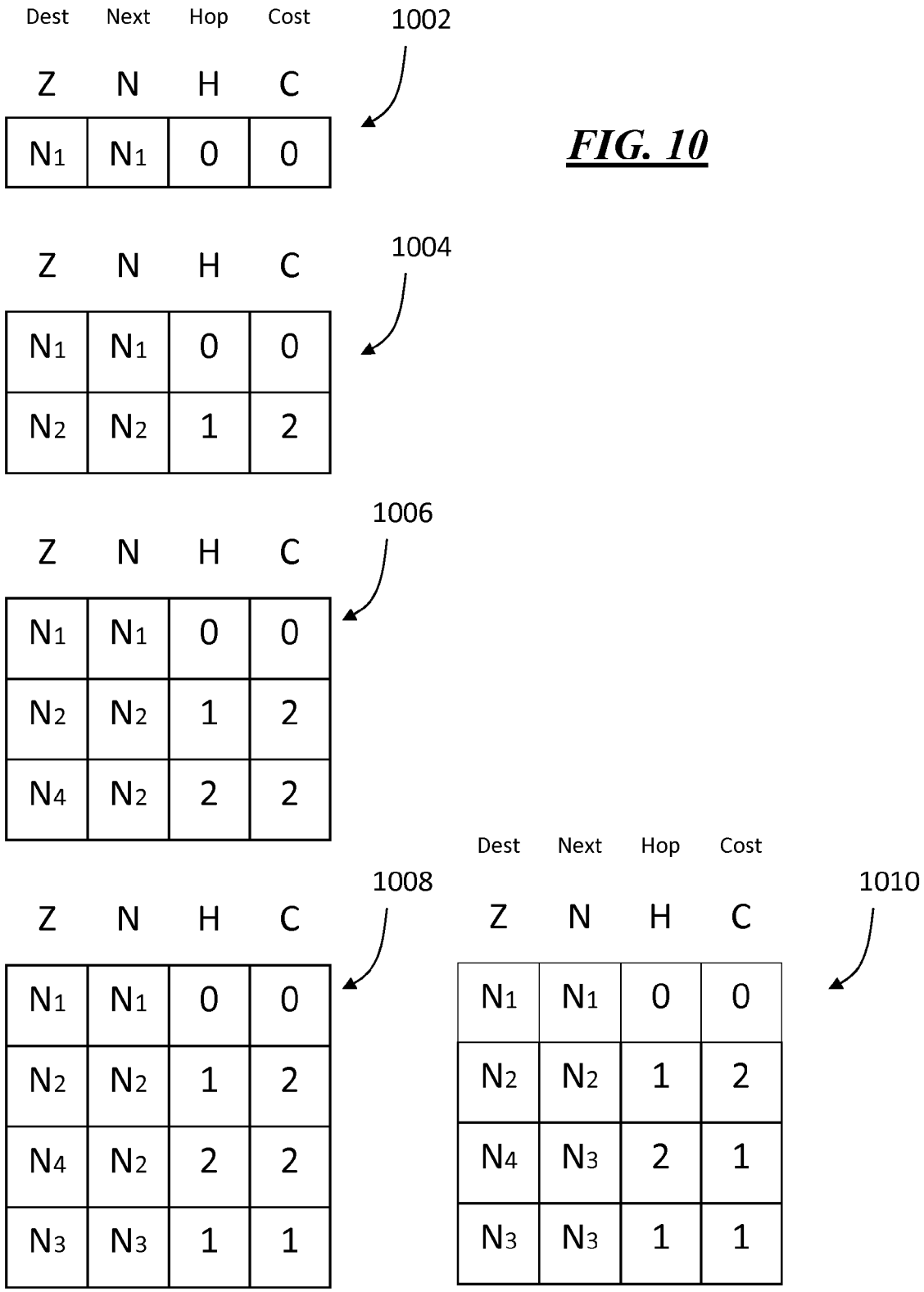
FIG. 10 illustrates the operation of an exemplary distance vector-based protocol implemented by a node device according to one embodiment.

In delivering data messages, the wireless network of FIG. 1 performs a dynamic routing scheme. Any of a variety suitable routing approaches may be used by embodiments of the invention. FIG. 10 illustrates the operation of an exemplary distance vector-based protocol implemented by node device N1. The example shows development of a routing table based on a link cost metric. In this example, node device $N_1$ joins the network but has not received any frames yet. At this point, indicated at 1002, the routing table of $N_1$, which consists of the fields destination (Z), next hop (N), hop count to destination (H), and link cost to the next hop (C), indicates only itself, $N_1$. At 1004, upon communicating with node device N2, node device $N_1$ recognizes it as a neighbor, with a hop count of 1, and with an ETX link cost of 2. At 1006, node device $N_1$ has discovered node device $N_4$, which is not a neighbor but is accessible via node device $N_2$. At 1008, neighboring node $N_3$ is discovered, having a good ETX count of 1. Node device exchange routing path information with one another. At 1010, node device $N_1$ learns that node $N_3$ is a neighbor of $N_4$ and has a good link cost to $N_4$. This information permits node device $N_1$ to update the routing table entry for destination $N_4$ to specify node $N_3$ as its next hop.

Updating the routing path is one example of using link cost to update a routing path characteristic. In a related embodiment, the routing path characteristic includes a data rate that may be used over the link to a node device's neighbor. For example, a favorable link cost determination suggests that the link may be usable with a fast data rate. In this case, a node device can increase its data rate for communications over the link.

This approach complements embodiments in which data rate is included as a transmission performance parameter. For example, transmission performance is monitored for each data rate used over the link, and the node device may discover that there is a practical data rate limit at which point the transmission performance degrades. In this manner, an optimal data rate-transmission performance trade-off can be attained.

In another aspect of the invention, each pair of neighboring node devices each monitors a transmission performance parameter, and accumulates transmission performance data. A preferred set of transmission performance data is selected from among the transmission performance data that is accumulated in either one node device or the other node device, from which to determine a packet routing path characteristic applicable to packets to be transmitted via one (or the other) of the node devices.

In one type of embodiment, neighboring nodes exchange link cost statistics (or transmission performance information from which the link cost can be determined by separate node devices). For example, node devices may exchange their bucket filters. In another example, node device exchange their self-determined link cost values, along with some indicator of the strength (i.e., quantity) of statistical data on which their link cost value is based. In one approach, when two node devices connect, the master always sends the bucket filter and link cost of the shared link between them to its neighbor as the body of a message. The received bucket filter is always accepted by the slave even if slave has more samples.

The slave sends its filter under two scenarios:

i) The master has no samples, which means that it has come out of reset ii) The slave has x (e.g. 100) samples more than master.

In a related embodiment, when two nodes connect, the master always sends the data amount and link cost to its neighbor. If the amount of data indicates that the master has more samples than the slave's, local filter; slave requests the master's bucket filter to take the place of its own. The slave sends its bucket filter to the master under two scenarios:

i) The master has no samples which means that it has come out of reset ii) The slave has x samples more than master.

In either approach, neighboring devices are able to reconcile different link cost values, with the strength of the data on which the varying link costs are based being the arbiter.

Figure 11:
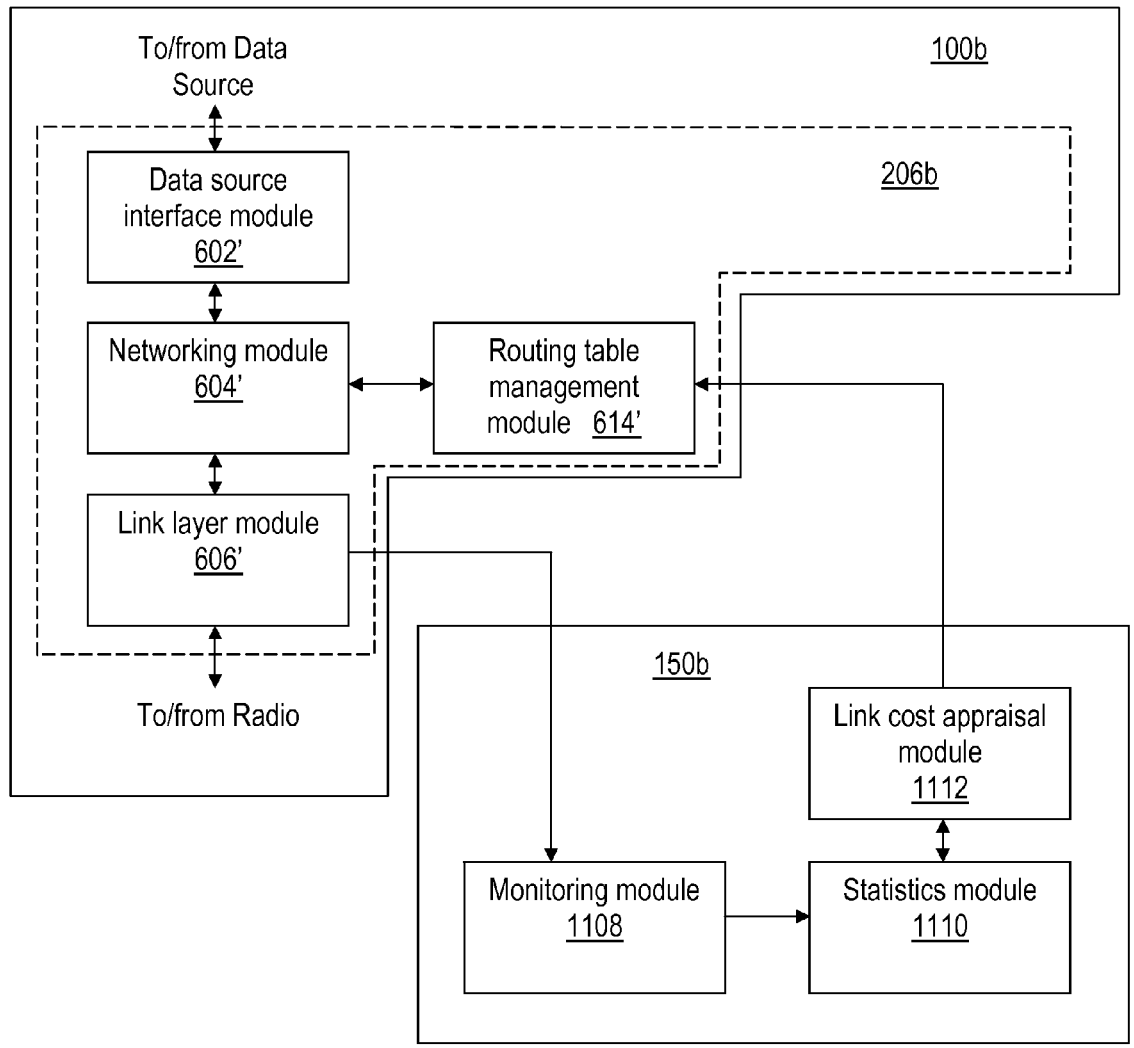
FIGS. 11 and 12 illustrate embodiments in which a neighboring device handles portions of link cost determination for a subject node device to varying degrees according to embodiments of the invention.

In another type of embodiment, portions of the link cost estimation for a given node device are distributed to another device. Referring now to FIG. 11, functional modules of an exemplary node device 100b are illustrated. In the embodiment shown in FIG. 11, node device 100b includes controller 206b, which is similar to controller 206a of the embodiments described above with reference to FIG. 6 in that the modules 602', 604', 606', and 614' are similar to counterpart modules 602, 604, 606, and 614, respectively, of node device 100a. However, monitoring module 1108, statistics module 1110, and link cost appraisal module 1112, although similar in function to respective counterpart modules 608, 610, and 612, modules 1108-1112 are realized in neighboring node device 150b rather than in node device 100b. In this approach, modules 1108-1112 of neighboring node device 150b may function like modules 608-612 when they are working on behalf of node device 150b; however, the result of their operation insofar as node device 100b is concerned, produces a link cost for only the shared link. In a related embodiment, node device 100b likewise obtains link cost information from all of its other neighbors. Accordingly, this type of embodiment may omit the bucket filter storage entirely from node device 100b.

Figure 12:
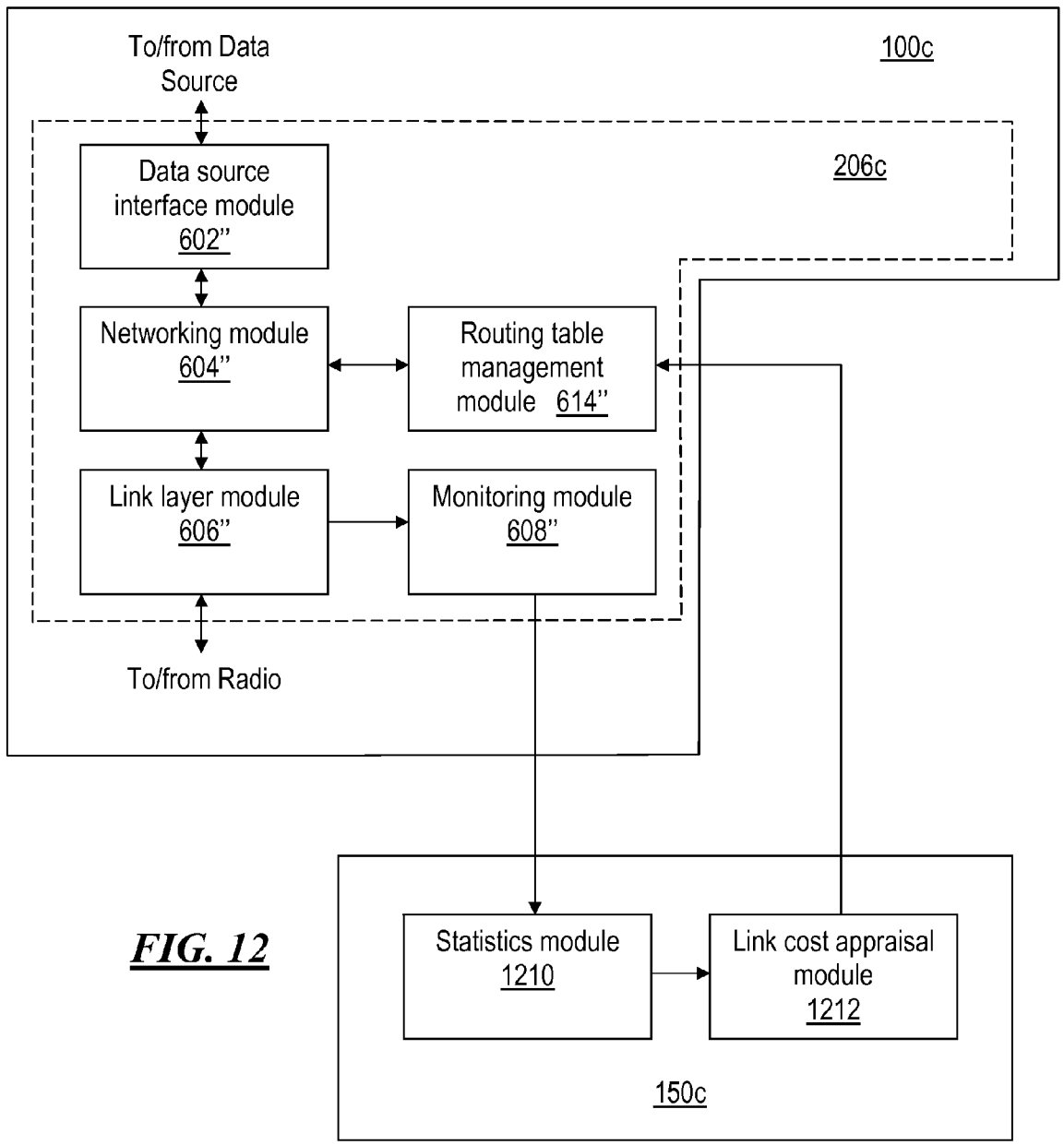

FIG. 12 illustrates another variation, in which the link cost determination is only partially distributed among neighbors. Here, node device 100c (with controller 206c) includes modules 602", 604", 606", 608", and 614". These modules operate similarly to counterpart modules 602, 604, 606, 608, and 614, respectively, except that monitoring module 608" transmits its output to statistics module 1210 of neighboring node device 150c, which also includes link cost appraisal module 1212 that returns its output to routing table management module 612" as shown. In this approach, node device 100c performs its own monitoring, but relies on neighboring node device 150c to perform the statistical analysis and storage of sampled data, as well as the functionality of analyzing the statistical data to produce the link cost value.

The approaches of the embodiments of FIGS. 11 and 12 (and variations thereof which are apparent to persons of skill in the relevant arts) are useful in cases where node devices 100b or 100c have limited power availability (i.e., are low-power battery-operated devices), or have limited processing capacity to perform the statistical analyses and other link cost-related processing.

In another related embodiment, node devices are configured to communicate their node-specific networking participation preferences. According to one approach, node devices maintain a measure of their operating (i.e., computing or communications) capacity. Node devices that have a relatively low measure of operating capacity inform their neighbors of a relatively reduced preference to avoid being used as an intermediate hop if possible. Conversely, node devices having high operating capacity can in similar fashion indicate a relatively increased preference to promote their use as an intermediate hop. In one such embodiment, the preference is communicated via a specialized control message. In a related approach, the neighboring devices indirectly represent the subject node device's preference by biasing their existing link cost measure by a positive or negative amount (for instance, as a correction to the ETX value, e.g., ETX+1.5). Alternatively, neighboring nodes maintain a separate data structure (e.g., routing table) parameter for neighbor preference, and each node can communicate changes in its network participation preference directly to its neighbors as such.

In one embodiment of this type, in a wireless multi-hop network in which node devices communicate a plurality of data messages to one another, a method for determining packet routing includes:

storing, by a first node device, a measure of operating capacity;

indicating, by the first node device to its neighboring node devices, a networking participation preference that is based on the operating capacity, in response to an indication of a relatively increased networking participation preference, receiving, by the first node device, a relatively greater quantity of messages to be forwarded to neighboring node devices; and in response to an indication of a relatively reduced networking participation preference, receiving, the first node device, a relatively smaller quantity of messages to be forwarded to neighboring devices.

Optionally, in the indicating of the networking participation preference, a control message is sent to neighboring node devices containing the networking participation preference of the first node device. In a related embodiment, the first node device provides to its neighboring node devices a measure of link cost, and in the indicating of the networking participation preference, a bias value is added to the measure of the link cost. In another variation, the first node device maintains a data structure representing networking participation preferences for neighboring node devices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. In a wireless multi-hop network in which node devices communicate a plurality of data messages to one another that are each formatted as a series of at least one packet that is further formatted as a series of at least one frame, a method for determining packet routing for a first node device based on passive measurement of data messages over a plurality of wireless links formed between the first node device and neighboring node devices including a neighboring second node device, the method comprising:
    transmitting, by the first node device, a first data message of the plurality of data messages to the second node device via a corresponding wireless link, the first data message being an in-band, non-overhead message;
    monitoring, by at least one of the first node device and the second node device, at least one transmission performance parameter corresponding to only a selected subset of frames of the series of at least two one frames of the first data message, wherein the selected subset of frames has structural similarity to selected subsets of frames of other data messages communicated and monitored by other node devices of the network;
    determining a link cost associated with the wireless link based on at least one transmission performance parameter value produced as a result of the monitoring of the at least on transmission performance parameter;
    obtaining, by the first node device, a packet routing path characteristic applicable to packets to be transmitted via the first node device and representing a preferred routing path from among the plurality of wireless links with neighboring node devices, the packet routing path having been generated based on a comparison of link costs corresponding to individual ones of the plurality of wireless links with neighboring node devices, including the link cost associated with the wireless link corresponding to the second node device; and
    storing, by the first node device, the obtained packet routing path characteristic.

2. The method of claim 1, wherein in transmitting the first data message, the first data message contains data originated by a source node device and intended to be received and acted upon by a destination node device.

3. The method of claim 1, wherein the monitoring of the at least one transmission performance parameter includes storing past values of the at least one parameter, and wherein the determining of the link cost includes computing a statistical summary based on the past values.

4. The method of claim 3, wherein in the monitoring of the at least one transmission performance parameter, the statistical summary represents a running average with greater weight attributed to more recent values.

5. The method of claim 3, wherein in the monitoring of the at least one transmission performance parameter, the statistical summary represents a value assigned to one of a plurality of bins, wherein boundaries defining each of the plurality of bins are dynamically adjustable.

6. The method of claim 1, wherein in the monitoring of the at least one transmission performance parameter, the selected subset of frames consists essentially of predefined frames that are present in all data messages.

7. The method of claim 1, wherein in the monitoring of the at least one transmission performance parameter, the selected subset of frames includes frames associated with an authentication portion of the first data message.

8. The method of claim 1, wherein in the monitoring of the at least one transmission performance parameter, the selected subset of frames includes the first n frames of the first data message, wherein n is a predefined quantity.

9. The method of claim 1, wherein the monitoring of the at least one transmission performance parameter includes counting re-transmissions of each frame of the selected subset of frames and wherein the link cost represents an expected transmission count (ETX).

10. The method of claim 1, wherein the monitoring the at least one transmission performance, parameter includes obtaining a value of the at least one transmission performance parameter selected from the group consisting of: a time duration for successful transmission, data rate, quantity of retransmissions.

11. The method of claim 1, wherein in the monitoring of the at least one transmission performance parameter, the structural similarity of the selected subset of frames includes similarity of a degree such that transmission success of the selected subset of frames is unaffected by any variations in frame structure of the frames of selected subsets among the first data message and the other data messages.

12. The method of claim 1, wherein in the monitoring of the at least one transmission performance parameter, a structural similarity of the selected subset of frames includes similarity of a distribution of sizes of frames of the selected subsets among the first data message and the other data messages.

13. The method of claim 1, wherein in the monitoring of the at least one transmission performance parameter, a structural similarity of the selected subset of frames includes similarity of a relative arrangement, within a corresponding message, of the frames of the selected subsets among the first data message and the other data messages.

14. The method of claim 1, further comprising: transmitting, by the first node device, a plurality of data messages to the second node device via the wireless network; and monitoring, by at least one of the first node device and the second node device, at least one transmission performance parameter corresponding to a selected subset of frames of the series of at least two frames of all data messages of the plurality of data messages transmitted by the first node device to the second node device.

15. The method of claim 1, wherein the storing of the packet routing path characteristic includes storing a determination of whether the wireless link should be included in a routing path to a particular destination node device.

16. The method of claim 1, wherein the storing of the packet routing path characteristic includes storing criteria for adjusting a data rate to be used in transmitting messages over the wireless link.

17. The method of claim 1, wherein in the monitoring of the at least one transmission performance parameter, the second node device performs the monitoring and reports transmission performance parameter values to the first node device.

18. The method of claim 1, wherein in the monitoring of the at least one transmission performance parameter, the first node device performs the monitoring.

19. The method of claim 1, wherein in the monitoring of the at least one transmission performance parameter, the second node device performs the monitoring; and wherein in the determining of the link cost associated with the wireless link, the second node device determines the link cost and reports the link cost to the first node device.

20. The method of claim 1, wherein the wireless multi-hop network includes a third node device; and wherein the third node device receives the transmission performance parameter value; and wherein in determining of the link cost associated with the wireless link, the third node device determines the link cost and reports the link cost to the first node device.

21. The method of claim 1, wherein the wireless multi-hop network includes a third node device; and wherein the third node device obtains the link cost and determines the packet routing path characteristic; and wherein the method further comprises: receiving, by the first node device, the packet routing path characteristic from the third node device.

22. The method of claim 1, further comprising: transmitting, by the first node device, a second data message of the plurality of data messages to the second node device via the wireless link; and wherein in the monitoring of the at least one transmission performance parameter, a sampling determination is made as to whether to monitor at least one transmission performance parameter corresponding to a selected subset of frames of the second data message, wherein the sampling determination is based on comparing a time duration between the first data message and the second data message against a periodicity criterion.

23. A network node device for use in a wireless multi-hop network in which node devices communicate a plurality of data messages to one another that are each formatted as a series of at least one packet which is further formatted as a series of at least one two frames, the node device comprising:
  a radio circuit and a controller operatively coupled to the radio circuit, the radio circuit and the controller adapted to establish wireless links between the node device and neighboring node devices including a second node device, and to cause the node device to transmit a first data message of the plurality of data messages to the second node device via a corresponding wireless link, the first data message being an in-band, non-overhead message;
  the controller adapted to implement a monitoring module for monitoring at least one transmission performance parameter corresponding to only a selected subset of frames of the series of at least one two frames of the first data message, wherein the selected subset of frames has structural similarity to selected subsets of frames of other data messages communicated and monitored by other node devices of the network;
  the controller further adapted to implement a link cost determining module for determining a link cost associated with the wireless link based on at least one transmission performance parameter value of the at least on transmission performance parameter obtained by the monitoring module; and
  the controller further adapted to implement a networking module adapted to obtain a packet routing path characteristic applicable to packets to be transmitted via the first node device and representing a preferred routing path from among the plurality of wireless links with neighboring node devices, the packet routing path having been generated based on a comparison of link costs corresponding to individual ones of the plurality of wireless links with neighboring node devices, including the link cost associated with the wireless link corresponding to the second node device, and to apply a packet routing path characteristic to packets to be transmitted via the node device.

24. The device of claim 23, wherein the first data message contains data originated by a source node device and intended to be received and acted upon by a destination node device.

25. The device of claim 23, wherein the monitoring module is adapted to store past values of the at least one transmission performance parameter, and wherein the link cost includes a statistical summary based on the past values.

26. The device of claim 25, wherein in the statistical summary represents a running average with greater weight attributed to more recent values.

27. The device of claim 25, wherein the statistical summary represents a value assigned to one of a plurality of bins, wherein boundaries defining each of the plurality of bins are dynamically adjustable.

28. The device of claim 23, wherein the selected subset of frames consists essentially of predefined frames that are present in all data messages.

29. The device of claim 23, wherein the selected subset of frames includes frames associated with an authentication portion of the first data message.

30. The device of claim 23, the selected subset of frames includes the first n frames of the first data message, wherein n is a predefined quantity.

31. The device of claim 23, wherein the monitoring module is adapted to obtain a count of re-transmissions of each frame of the selected subset of frames and wherein the link cost represents an expected transmission count (ETX).

32. The device of claim 23, wherein the monitoring module is adapted to obtain a value of the at least one transmission performance parameter selected from the group consisting of: a time duration for successful transmission, data rate, quantity of retransmissions.

33. The device of claim 23, wherein the structural similarity of the selected subset of frames includes similarity of a degree such that transmission success of the selected subset of frames is unaffected by any variations in frame structure of the frames of selected subsets among the first data message and the other data messages.

34. The device of claim 23, wherein a structural similarity of the selected subset of frames includes similarity of a distribution of sizes of frames of the selected subsets among the first data message and the other data messages.

35. The device of claim 23, wherein a structural similarity of the selected subset of frames includes similarity of a relative arrangement, within a corresponding message, of the frames of the selected subsets among the first data message and the other data messages.

36. The device of claim 23, wherein the radio circuit and controller are adapted to transmit a plurality of data messages to the second node device via the wireless network; and wherein the monitoring module is adapted to monitor at least one transmission performance parameter corresponding to a selected subset of frames of the series of at least two frames of all data messages of the plurality of data messages transmitted by the node device to the second node device.

37. The device of claim 23, wherein the he packet routing path characteristic is based on a determination of whether the wireless link should be included in a routing path to a particular destination node device.

38. The device of claim 23, wherein the packet muting path characteristic is based on criteria for adjusting a data rate to be used in transmitting messages over the wireless link.

39. The device of claim 23, wherein the wireless multi-hop network includes a third node device; and wherein the third node device receives the transmission performance parameter value; and wherein the third node device determines the link cost and reports the link cost to the node device.

40. The device of claim 23, wherein the wireless multi-hop network includes a third node device; and wherein the third node device obtains the link cost and determines the packet routing path characteristic; and wherein the node device is adapted to receive the packet routing path characteristic from the third node device.

41. The device of claim 23, wherein the node device is adapted to transmit a second data message of the plurality of data messages to the second node device via the wireless link; and wherein in the monitoring module is adapted to make a sampling determination as to whether to monitor at least one transmission performance parameter corresponding to a selected subset of frames of the second data message, wherein the sampling determination is based on comparing a time duration between the first data message and the second data message against a periodicity criterion.

42. In a wireless multi-hop network in which node devices communicate a plurality of messages to one another that are each formatted as a series of at least one packet that is further formatted as a series of at least two frames, a method for determining packet routing for a first node device based on measurement of messages over a wireless link formed between the first node device and a neighboring second node device, the method comprising:
   transmitting, by the first node device, messages to the second node device via the wireless link;
   monitoring, by each of the first node device and the second node device, at least one transmission performance parameter corresponding to a subset of frames of the series of at least two frames of the messages, wherein each of the first node device and the second node device accumulates transmission performance data;
   selecting, by a node device, a preferred set of transmission performance data, as between the transmission performance data that is accumulated in the first node device and or the second node device, from which to determine a packet routing path characteristic applicable to packets to be transmitted via the first node device, such that the preferred set of transmission performance data consists of transmission performance data that was stored in only one of the first node device or the second node device.

43. The method of claim 1, wherein the first data message is an application-layer data message.

44. The device of claim 23, wherein the first data message is an application-layer data message.

* * * * *